(12) United States Patent
Ichioka et al.

(10) Patent No.: US 6,227,598 B1
(45) Date of Patent: May 8, 2001

(54) THERMOPLASTIC OLEFIN ELASTOMER MOLDED ARTICLE

(75) Inventors: Tetsumi Ichioka, Mie-gun; Masao Kobayashi, Ichinomiya; Junji Koizumi, Nagoya; Hiroshi Iwasaki, Inazawa; Kazuo Takeda, Nishikasugai-gun, all of (JP)

(73) Assignee: Toyoda Gosei Co. Ltd., Aichi (JP)

( * ) Notice: Subject to any disclaimer, the term of this patent is extended or adjusted under 35 U.S.C. 154(b) by 0 days.

(21) Appl. No.: 09/386,367

(22) Filed: Aug. 31, 1999

(30) Foreign Application Priority Data

Mar. 19, 1999 (JP) .................................. 11-076595

(51) Int. Cl.$^7$ ...................................................... B60J 1/20
(52) U.S. Cl. .......................... 296/93; 428/119; 428/120; 49/475.1
(58) Field of Search ............................. 428/424.2, 424.6, 428/424.8, 500, 515, 516, 518, 523, 119, 120; 296/93; 49/475.1

(56) References Cited

U.S. PATENT DOCUMENTS

| 4,833,847 | * | 5/1989 | Inayama et al. | 52/208 |
| 4,889,762 | * | 12/1989 | Uchiyama et al. | 428/195 |
| 4,953,907 | * | 9/1990 | Sugita et al. | 296/93 |
| 5,752,352 | * | 5/1998 | Goto et al. | 52/208 |
| 5,972,492 | * | 10/1999 | Murakami et al. | 428/318.8 |

* cited by examiner

Primary Examiner—D. S. Nakarani
Assistant Examiner—Christopher Paulraj
(74) Attorney, Agent, or Firm—Pillsbury Winthrop LLP

(57) ABSTRACT

A thermoplastic olefin elastomer molded article has a sealant contact portion coming into contact with a urethane sealant and is substantially made of thermoplastic olefin elastomer. At least the sealant contact surface of the sealant contact portion is made of a polyvinyl chloride layer or a thermoplastic polyurethane layer. At least the portion of the molded article adjoining the polyvinyl chloride layer or the thermoplastic polyurethane layer is made of a chlorinated thermoplastic olefin elastomer which is obtained by replacing part or the whole of the non-rigid phase of a thermoplastic olefin elastomer with chlorinated polyethylene and is capable of thermal fusion bonding to the polyvinyl chloride layer or the thermoplastic polyurethane layer.

5 Claims, 4 Drawing Sheets

THERMOPLASTIC OLEFIN ELASTOMER MOLDED ARTICLE

BACKGROUND OF THE INVENTION

1. Field of the Invention

This invention relates to a thermoplastic olefin elastomer (hereinafter abbreviated as TPO) molded article. More particularly it relates to a TPO molded article which has a sealant contact portion coming into contact with a urethane sealant and which consists substantially of a TPO material.

The present application is based on Japanese Patent Application No. Hei. 11-76595, which is incorporated herein by reference.

2. Description of the Related Art

The present invention will be described with particular reference to a molding 26 used at the periphery of an automobile windowpane as shown in FIG. 1 (hereinafter simply referred to as a molding) for instance, but the invention is not limited thereto and is applicable to other moldings having a sealant contact portion, such as a roof molding 27 shown in FIG. 4 and a sealant dam 20 shown in FIG. 1.

A window shield (windowpane) 12 is fitted into a window frame 14 formed by sheet metal working as follows. The window frame 14 is made up of a flange 16 forming the bottom (the car interior side) and an upright wall 24.

A sealant 22 is fitted to the flange 16. A window shield 12 having a sealant dam 20 adhered to the periphery thereof via a both-sided adhesive tape 18 is fitted into the frame 14 and pressed toward the car interior to press down the sealant 22, whereby the window shield 12 is fixed to the flame 14. Then a molding 26 is fitted into the space surrounded by the window shield 12 and the upright wall 24.

The molding 26 basically comprises a main body 28 that is on the exterior side, a leg 30 that extends from the main body 28 toward the interior, and a sealant contact portion 32 that is provided at the tip of the leg 30. The main body 28 has sealing lips 34 and 36 by which it hooks on to the exterior periphery of the windowpane 12 and the exterior periphery of the frame 14, respectively. The sealant contact portion 32 has a lip 38 by which it hooks on to the interior periphery of the windowpane 12 and a lip 40 in friction contact with the upright wall 24 of the flame 14.

The molding 26 has been produced by extruding polyvinyl chloride (hereinafter abbreviated as PVC), etc., cutting the profile, setting cut pieces of the profile in a mold, and making the corners by injection molding to obtain an annular molding.

A urethane sealant is generally used as the sealant 22 for its adhesion to glass, vibration damping properties, durability, and sealing properties. Since the sealant 22 and the molding 26 should have strong heat-resistant adhesion, the surface 32a of the sealant contact portion 32 of the PVC molding 26 which is to come into contact with the sealant 22 is usually coated with an isocyanate primer to secure adhesiveness.

From the viewpoint of environmental conservation and resources saving, it has been demanded to replace PVC with other molding materials. Hence the inventors have focused their study on TPO which has the lowest density in thermoplastic elastomers and made efforts in development. They have found, however, that a urethane sealant fails to have sufficient adhesion to TPO for practical use, particularly adhesive strength after a heat test. A primer that secures adhesion between a urethane sealant and TPO has not yet been developed.

SUMMARY OF THE INVENTION

An object of the present invention is to provide a TPO molded article consisting substantially of a TPO material which exhibits practical adhesive strength to a urethane sealant.

The above object is accomplished by a TPO molded article which has a sealant contact portion and consists substantially of a TPO material, wherein the sealant contact portion has a PVC layer or a thermoplastic polyurethane (hereinafter abbreviated as TPU) layer on its surface coming into contact with a urethane sealant, and at least the portion of the molded article which adjoins the PVC layer or the TPU layer is made of a chlorinated TPO capable of thermal fusion bonding to the PVC layer or the TPU layer which is obtained by replacing part or the whole of the non-rigid phase of a TPO with chlorinated polyethylene (hereinafter abbreviated as PE).

The chlorinated TPO preferably has a chlorine content of 1 to 20% by weight to secure thermal fusion bonding to the PVC or TPU layer.

Features and advantages of the invention will be evident from the following detailed description of the preferred embodiments described in conjunction with the attached drawings.

DETAILED DESCRIPTION OF THE PREFERRED EMBODIMENTS

Figure 1:
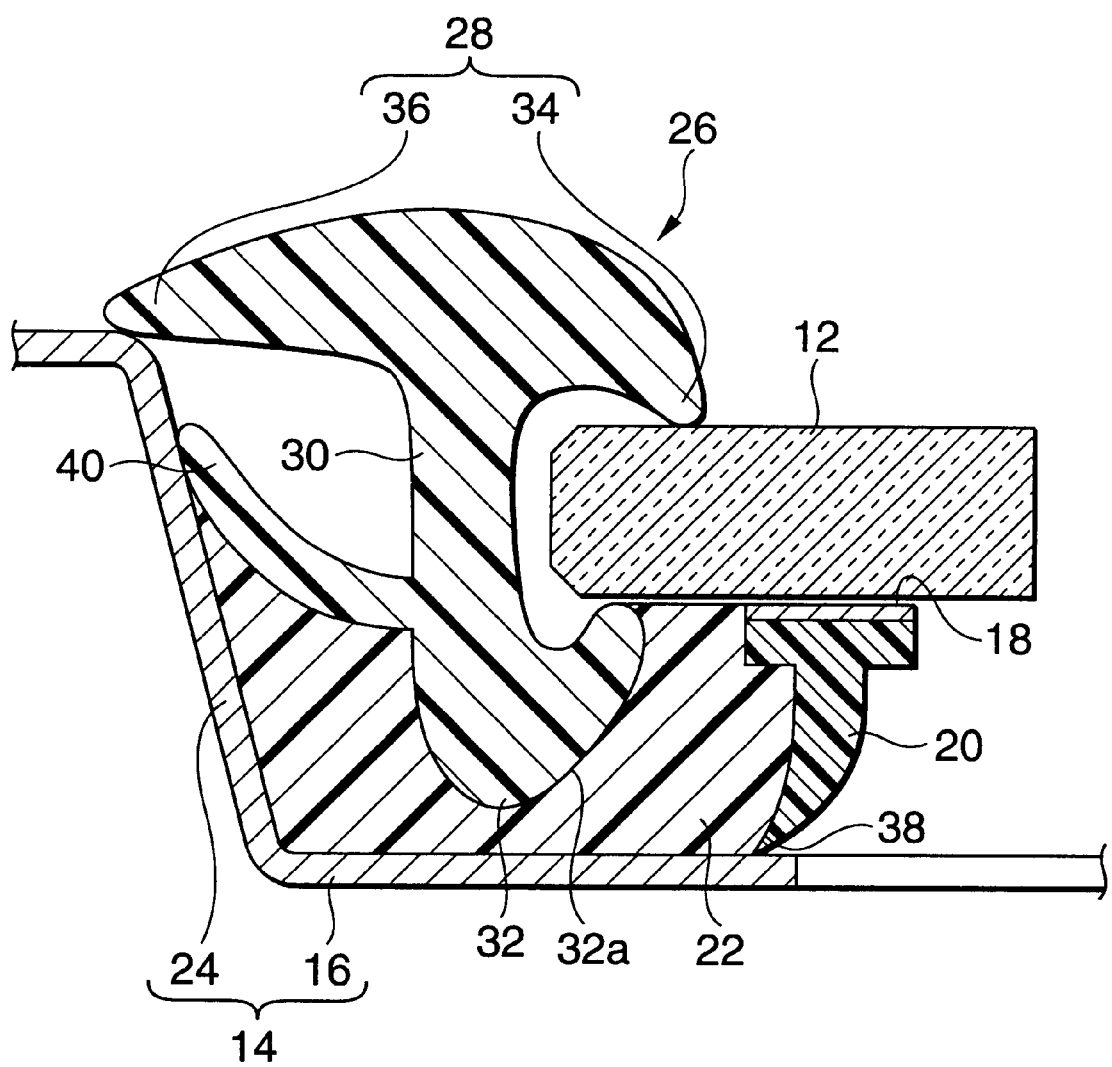
FIG. 1 is a cross section of a window molding used at the periphery of an automotive windowpane.

The present invention will be described in detail hereinafter. In what follows, all the parts and percents are by weight unless otherwise noted. The same elements previously described will be given the same numerals as used above, and the explanation therefor is totally or partly omitted.

The molding 26 according to the invention has a sealant contact portion 32 which is to come into contact with a urethane sealant 22 and substantially comprises a TPO material. The sealant contact portion 32 has a PVC layer or a TPU layer on its surface 32a. At least the portion of the molded article (the main body 28, the leg 30, and the sealant contact portion 32) which adjoins the PVC layer or the TPU layer is made of a chlorinated TPO capable of thermal fusion bonding to the PVC layer or the TPU layer which is obtained by replacing part or the whole of the non-rigid phase of a TPO with chlorinated PE. The chlorinated PE preferably has a chlorine content of 1 to 20 wt %, still preferably 3 to 15 wt %.

Figure 2:
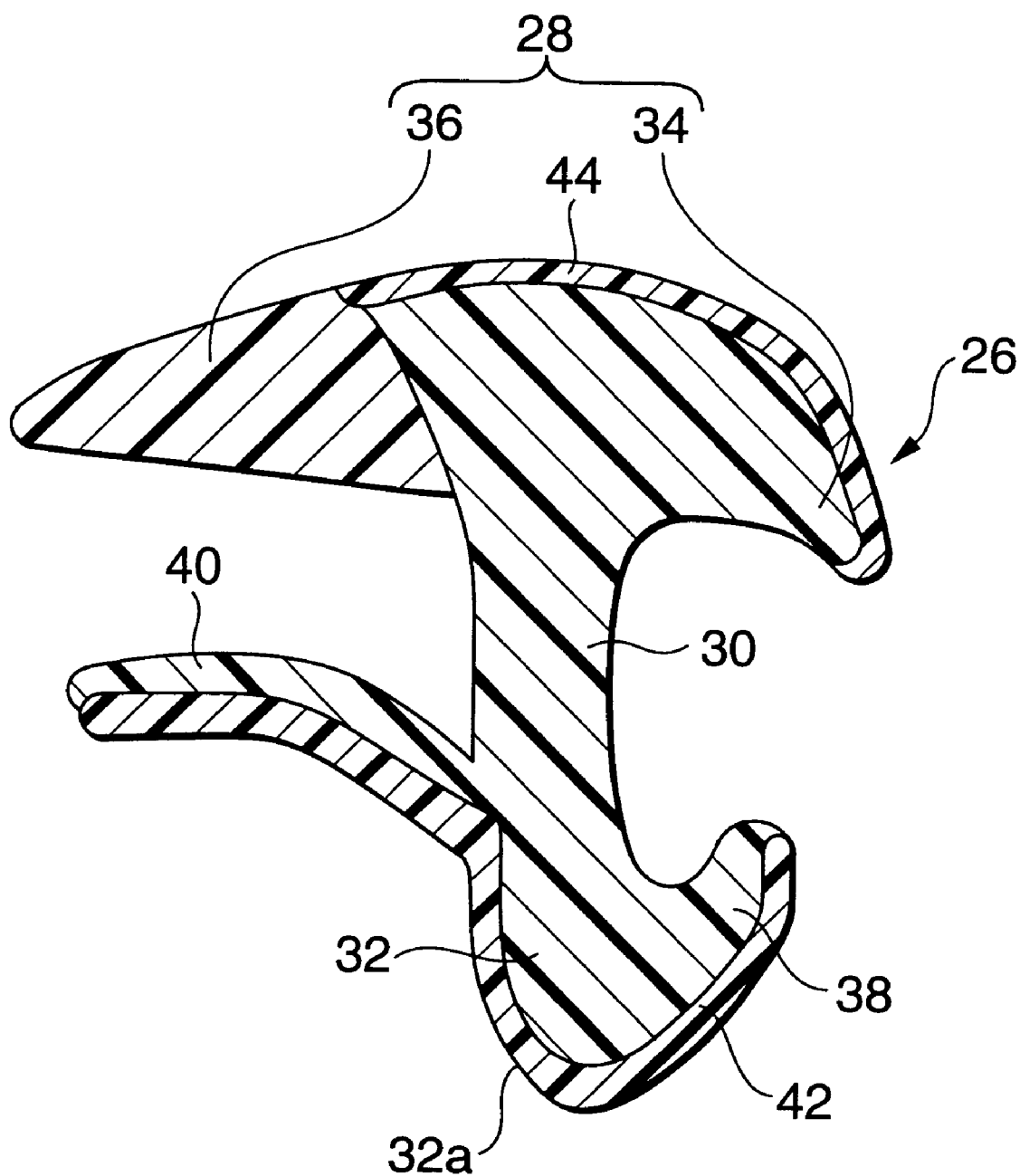
FIG. 2 is a cross section of a window molding according to an embodiment of the invention.

The molding 26 is shown in FIG. 2 in more detail. As stated above, the molding 26 is composed of the main body 28, the leg 30, and the sealant contact portion 32. The main body 28 has sealing lips 34 and 36 by which it hooks on to the exterior periphery of the windowpane 12 and the exterior periphery of the frame 14, respectively. The sealant contact portion 32 has a lip 38 by which it hooks on to the interior periphery of the windowpane 12 and a lip 40 in friction contact with the upright wall 24.

The sealant contact surface 32a of the sealant contact portion 32 is made of PVC or TPU 42, while the other portions (the main body 28, the leg 30, and the sealant contact portion 32) of the molding is made of a chlorinated TPO.

The terminology "chlorinated TPO" denotes a TPO comprising an olefin resin as a rigid phase component and an ethylene-α-olefin copolymer rubber as a non-rigid phase component with a part or the whole of the ethylene-α-olefin copolymer rubber being replaced with chlorinated PE rubber. The ratio of the rigid phase component to the non-rigid phase component usually ranges from 30/70 to 70/30 by weight, while varying depending on the hardness required of the chlorinated TPO. The hardness of the chlorinated TPO is adjustable to some extent by addition of process oil.

Examples of the olefin resin include polyethylene (PE), polypropylene (PP), polybutene (PB), and copolymers thereof. A propylene block copolymer is particularly preferred.

Examples of the ethylene-α-olefin copolymer rubber include a copolymer consisting of ethylene and an α-olefin and a copolymer consisting of ethylene, an α-olefin, and a non-conjugated diene. The α-olefin preferably includes propylene, and the non-conjugated diene preferably includes ethylidenenorbornene.

The ethylene-α-olefin copolymer rubber can be present in the TPO in an unvulcanized state, a sectionally vulcanized state or a totally vulcanized state. From the standpoint of compressive permanent strain, sectional vulcanization or total vulcanization (dynamic vulcanization) is preferred.

The chlorinated PE rubber preferably has a chlorine content of 25 to 60 wt %, particularly 40 to 50 wt %. Chlorinated PE rubber having too high a chlorine content has reduced compatibility with a propylene block copolymer or the ethylene-α-olefin copolymer rubber. On the other hand, chlorinated PE rubber having too low a chlorine content should be used in an increased amount, which naturally reduces the proportion of the ethylene-α-olefin copolymer rubber, making it difficult to control the hardness of the resulting molded article.

The chlorine content of the chlorinated TPO as a whole is adjusted preferably to 1 to 20 wt %, still preferably 3 to 15 wt % as above specified by adjusting the amount of the chlorinated PE rubber to be added. A chlorinated TPO having too low a chlorine content is difficult to fusion bond to the PVC layer in co-extrusion. If the chlorine content of the chlorinated TPO is too high, reduction of environmental pollution by decrease of chlorine, which is the chief aim of the present invention, is hardly expected. Out of ecological considerations it is desirable that the chlorine content be as low as is consistent with capability of fusion bonding to the PVC layer 42.

It is desirable, while not essential, that the sealing lip 36 be made of a TPO material softer than that making the other portions for securing sealing properties and that the exterior side of the sealing lip 34 be made of a TPO material harder than that making the other portions to form a wear layer 44 durable against wiping dust off the windowpane. For example, where the other portions (the main body 28, the leg 30 and the sealant contact portion 32) have a hardness $H_2$ (JIS A) of 85°, the sealing lip 36 and the wear layer 44 preferably have a hardness $H_3$ of 75° and 90°, respectively.

The sealing lip 36 and the wear layer 44 may be made of a general-purpose non-chlorinated TPO but are desirably made of a chlorinated TPO from the viewpoint of fusion bonding properties and co-extrudability. Examples of TPO compounds with varied hardness suited to different portions are shown in Table 1 below. Of these materials TPO-4 and TPO-5 are suitable as a sealing lip 36 and a wear layer 44, respectively.

TABLE 1

|  | TPO-1 | TPO-2 | TPO-3 | TPO-4 | TPO-5 |
|---|---|---|---|---|---|
| Block PP* | 45 | 40 | 40 | 35 | 50 |
| Chlorinated PE (Cl content: 45 wt %) | — | 10 | 30 | 10 | 10 |
| EPDM** | 45 | 35 | 20 | 35 | 30 |
| Process oil (paraffinic) | 10 | 10 | 10 | 20 | 10 |
| Overall Cl content (wt %) | 0 | 4.5 | 13.5 | 4.5 | 4.5 |
| Hardness $H_\alpha$ (JIS A) | 85° | 85° | 85° | 70° | 90° |

Note:
*Propylene block copolymer having an MFR of 5 g/10 min and an ethylene content of 7 wt %
**Ethylene-propylene-diene terpolymer having a propylene content of 25 wt %

Figure 3:
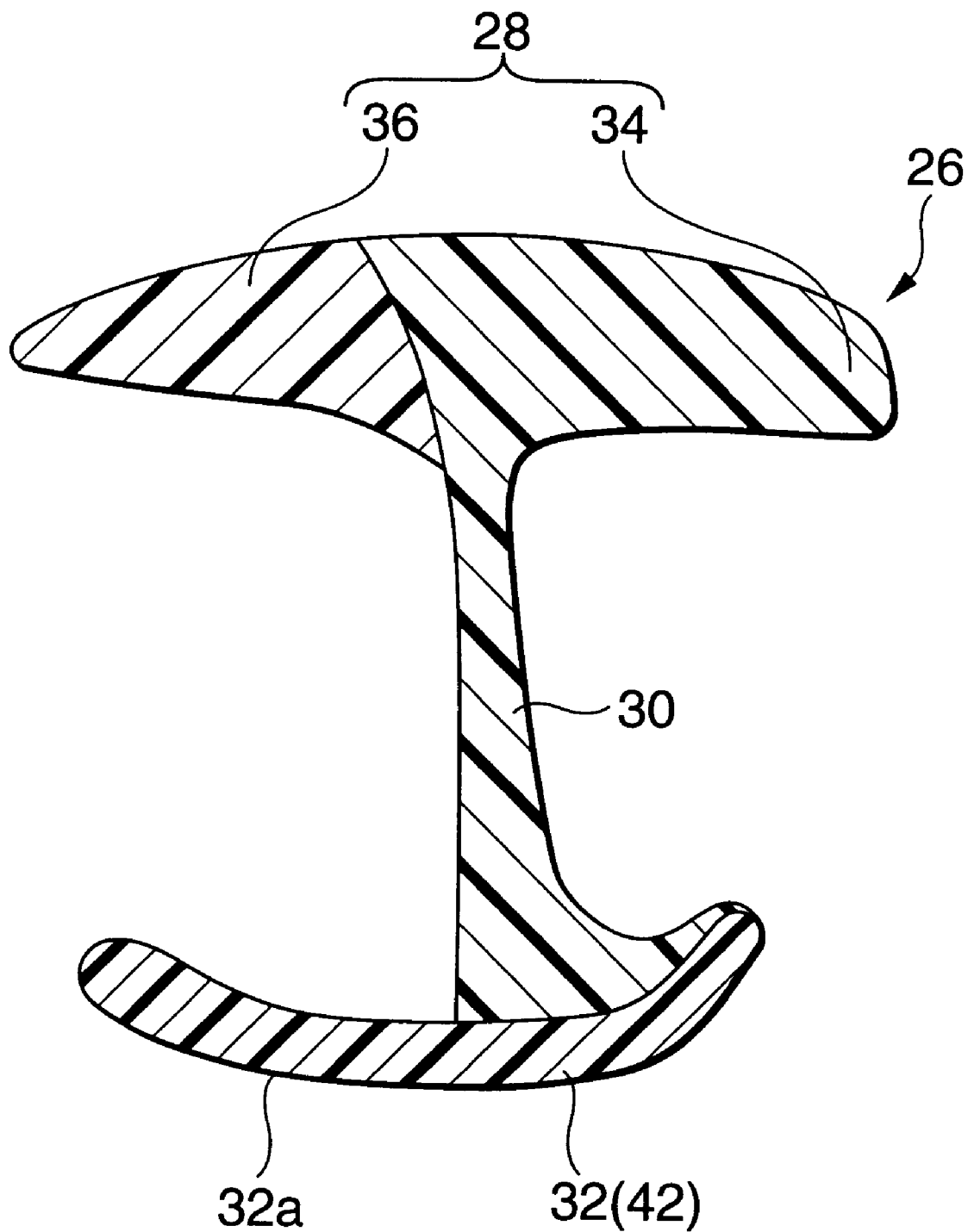
FIG. 3 is a cross section of another window molding according to the invention.

The PVC or TPU layer 42 may occupy the whole of the sealant contact portion 32 as in the embodiment shown in FIG. 3 but is desirably as thin as possible for reducing the chlorine content (in case of using PVC) or for reducing the material cost (in case of using TPU).

The PVC or TPU layer 42 could be provided by applying a dispersion coating inclusive of paste sol but is preferably formed by co-extrusion in view of productivity. The thickness of the co-extruded PVC or TPU layer is 0.05 to 1 mm. It is difficult to obtain a PVC or TPU layer thinner than 0.05 mm by co-extrusion, and, in addition, such a thin layer is not expected to produce sufficient adhesive strength to the urethane sealant 22 for practical use even with a urethane primer applied therebetween.

It is usually preferred to use a non-rigid PVC (tensile elongation at break: 180% or more under ASTM D-638) to form the PVC layer 42 so that the PVC layer 42 may be almost equal to the other part of the molding 26 in hardness and tensile modulus. Such a non-rigid PVC is prepared by adding 30 to 70 phr of an ester plasticizer, such as dioctyl phthalate (DOP; di(2-ethylhexyl)phthalate) to a vinyl chloride homopolymer or a copolymer mainly comprising vinyl chloride. Polyblend type PVC thermoplastic elastomers are also useful.

TPU forming the TPU layer 42 comprises a polymer chain comprising a diisocyanate and a short-chain glycol as a hard segment and a polymer chain comprising a diisocyanate and a long-chain glycol as a soft segment. The short-chain glycols include ethylene glycol, propylene glycol, and 1,4-butanediol, and the long-chain glycols include polyethers such as polyalkylene glycols (especially, PTMG: polytetramethylene glycol) and polyesters such as polycaprolactone and polycarbonate (see Kobunshi Gakkai (ed.), *Kobunshi Sozai One Point*-19 *Elastomer*, p. 75, Kyoritsu Shuppan (1989)). Of these long-chain glycols polycaprolactone is preferred for ease of obtaining good balance among water resistance, thermal aging resistance, oil resistance, and freeze resistance.

Examples of the diisocyanate which can be used preferably include aromatic diisocyanate compounds, such as 4,4'-diphenylmethane diisocyanate (MDI), crude MDI, liquid MDI, tolylene diisocyanate (TDI), and phenylene diisocyanate. Dimers, trimers, trimethylolpropane, and prepolymers of these diisocyanate compounds are also preferred for their handling properties. Further, examples of such diisocyanate include non-yellowing aliphatic or alicyclic diisocyanate compounds, such as hexamethylene diisocyanate (HMDI), xylene diisocyanate (XDI), hydrogenated XDI, 4,4'-methylenebiscyclohexyl diisocyanate (H12MDI), methylcyclohexyl diisocyanate (hydrogenated TDI), and isophorone diisocyanate (IPDI). Dimers, trimers, trimethylolpropane adducts, and prepolymers of these diisocyanate compounds are also preferred for their handling properties.

Similarly to the PVC layer, the TPU layer is preferably made of a non-rigid TPU material (tensile elongation at break: 180% or more) having the hard segment to soft segment ratio controlled so that the TPU layer may be almost equal to the other part of the molding 26 in hardness and tensile modulus.

Figure 4:
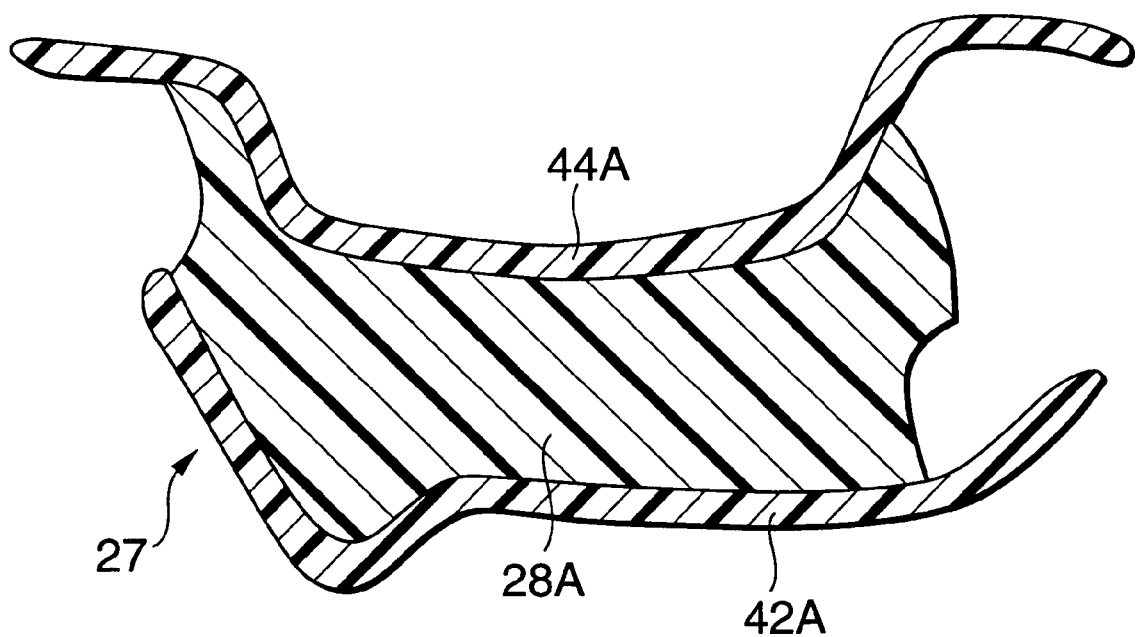
FIG. 4 is a cross section of a roof molding according to the invention.

While the present invention has been described taking a window shield molding as a specific example of the TPO molded article, it is also applicable to a roof molding 27 shown in FIG. 4, The main body 28A of the roof molding 27 is made of a chlorinated TPO, and the side of the main body 28A in contact with a sealant is formed of a PVC or TPU layer 42A. On the opposite side of the main body 28A, there is formed a wear layer 44A made of a chlorinated TPO having slightly higher hardness than the main body 28A.

In the TPO molded article according to the present invention, the sealant contact portion has a PVC or TPU layer at least on its surface in contact with a urethane sealant, and at least the portion of the molded article which adjoins the PVC or TPU layer is made of a chlorinated TPO capable of thermal fusion bonding to the PVC or TPU layer. Therefore, sufficient adhesive strength for practical use can be obtained between the molded article and the urethane sealant without special techniques for priming and the like.

In order to demonstrate the effects of the invention, the following test was carried out. The following materials were used in the test.

(1) PVC Layer Forming Material (Non-Rigid PVC)

Straight polymer having an average degree of polymerization of 1100, containing 55 phr of DOP as a plasticizer, and having a hardness $H_2$ (JIS A) of 85°.

(2) TPU Layer Forming Material (TPU)

Polycaprolactone-based TPU having a hardness $H_3$ (JIS A) of 85° and an elongation of 600%.

(3) Isocyanate Primer

"Sunstar 435720" available from Sunstar Giken K.K.

(4) Urethane Sealant

"WS-70" produced by Yokohama Rubber Co., Ltd.

Test Methods:

(1) Adhesion to Urethane Sealant

Each of the molding materials shown in Table 2 below was extruded to obtain a 1 mm thick sheet. A 30 mm wide and 100 mm long cut piece of the extruded sheet was coated with 5 g/100 cm² of the isocyanate primer and allowed to stand at room temperature (23° C.) for 24 hours. A urethane sealant ("WS-70" produced by Yokohama Rubber Co., Ltd.) was applied thereon by means of a handy gun to a coating thickness of 3 to 4 mm and allowed to stand at room temperature (23° C.) for 144 hours to set the sealant layer to prepare a test specimen.

The extruded sheet and the sealant layer were separated at the interface to a length of about 20 mm by means of a knife. The sealant layer was peeled by the hand at a peel angle of 90° or more while fixing the extruded sheet with the hand.

The condition of the separated surface was observed with the naked eye and rated as follows. The results obtained are shown in Table 2.

O . . . Cohesive failure of the sealant layer

X . . . Interfacial separation between the extruded sheet or the primer layer and the sealant layer.

TABLE 2

| Sealant Contact Side Material | | Non-rigid PVC | TPU | TPO-1 | TPO-2, TPO-4 or TPO-5 | TPO-3 |
|---|---|---|---|---|---|---|
| Adhesion to Sealant | Initial | o | o | x | x | o |
| | After Heat Test | o | o | x | x | x |

As can be seen from Table 2, the PVC or TPU layer exhibits adhesion to the urethane sealant, whereas all the TPO layers hardly exhibit sufficient adhesive strength for practical use. That is, TPO-1, which is a non-chlorinated TPO, and TPO-2, 4 or 5, whose chlorine content is as low as 4.5 wt %, fail to have practical adhesive strength both in the initial stage and after heat application. TPO-3 having a chlorine content as high as 13.5 wt % shows a practical adhesive strength in the initial stage but fails to retain the adhesive strength after heat application in the heat test (80° C., 400 hours in the oven).

(2) Adhesion Between PVC or TPU Layer and TPO Material

Each of TPO-1, TPO-2 and TPO-3 shown in Table 1 and the above-described non-rigid PVC and TPU was extruded to obtain a 1 mm thick sheet, and a 30 mm wide and 100 mm long strip was cut out of each extruded sheet. The PVC or TPU strip and each of the TPO strips were superposed on each other, and a half length of the laminate was hot press bonded on a press (180° C.×3 MPa×10 sec) followed by cooling to prepare a peel test specimen.

The PVC or TPU layer and the TPO layer were pulled apart by the hands to evaluate the fusion bonding properties according to whether the layers were separated completely (rated "X") or not separated (rated "O") with the naked eye. The results obtained are shown in Table 3.

TABLE 3

| | TPO-1 | TPO-2, 4 or 5 | TPO-3 |
|---|---|---|---|
| PVC | x | o | o |
| TPU | x | o | o |

A practical adhesive strength was secured between the PVC or TPU layer and TPO-2 or TPO-3, which are chlorinated TPO materials, whereas a practical adhesive strength was not obtained between the PVC or TPU layer and TPO-1, which is a non-chlorinated TPO material.

Although the invention has been described in its preferred form with a certain degree of particularity, it is understood that the present disclosure of the preferred form can be d arrangement of parts without departing from the spirit and the scope of the invention as hereinafter claimed.

What is claimed is:

1. A molding for a periphery of a windowpane comprising:

a leg disposed between a windowpane and a body of an automobile, a head portion covering an outer surface of the windowpane and the body of the automobile;

a sealant bonding the body of the automobile with the windowpane, the leg being bonded to the sealant;

a surface of the leg in contact with the sealant, the surface of the leg being formed of PVC or TPU;

a main body of the leg being formed of chlorinated TPO.

2. A molding according to claim 1, wherein an outer surface of the head portion is formed of a material more rigid than a material forming a main body of the head portion.

3. A molding according to claim 2, wherein both the outer surface and the main body of the head portion are formed of chlorinated TPO.

4. A molding according to claim 1, wherein the sealing lip of the main body of the head portion adjacent to the body of the automobile is formed of a material more rigid than the material forming a sealing lip adjacent to the windowpane.

5. A molding according to claim 4, wherein both the sealing lips comprise chlorinated TPO.

* * * * *